July 2, 1968        H. T. AVERY        3,391,274
MAGNETIC INDICIA WHEEL
Filed Dec. 9, 1963
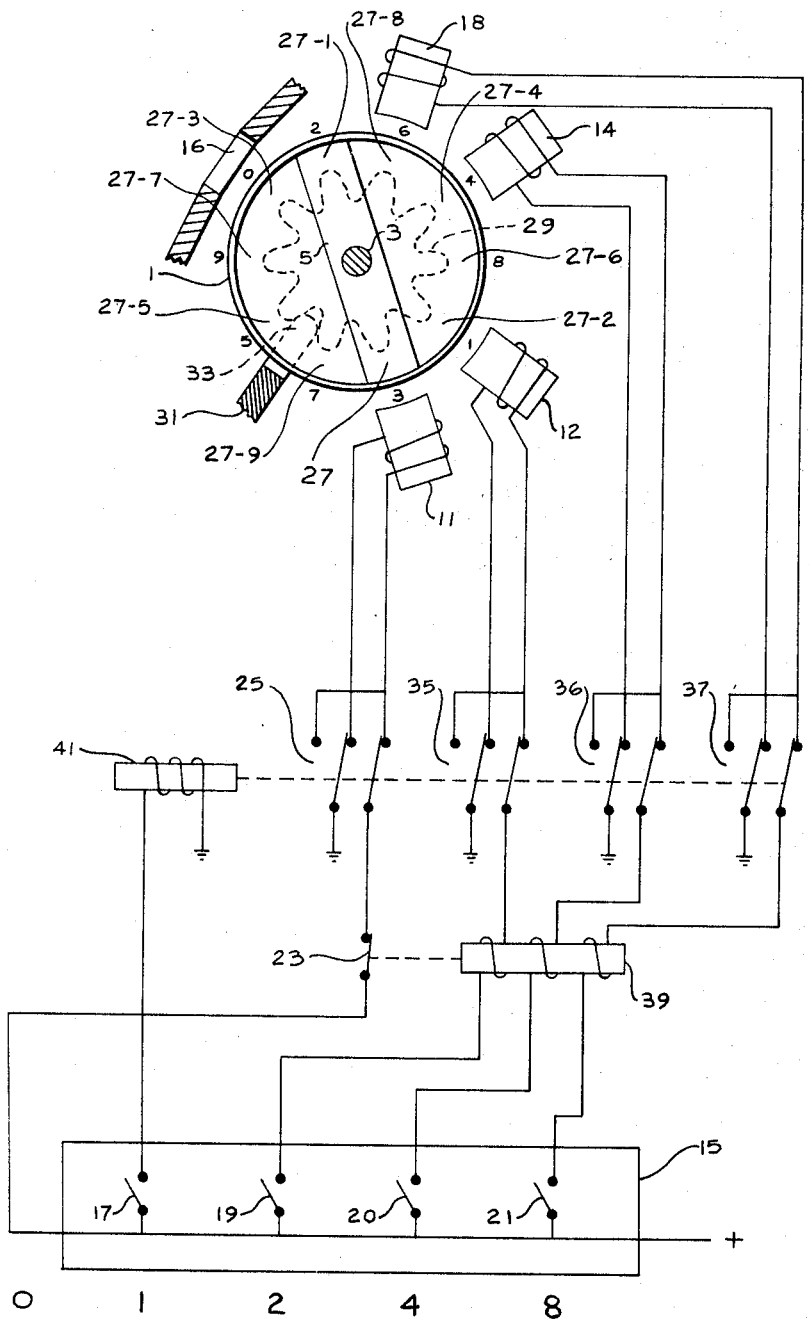
INVENTOR.
HAROLD T. AVERY
BY
*Clifton E. Clouse, Jr.*
AGENT 3,391,274
MAGNETIC INDICIA WHEEL
Harold T. Avery, Oakland, Calif., assignor to SCM Corporation, New York, N.Y., a corporation of New York
Filed Dec. 9, 1963, Ser. No. 329,103
6 Claims. (Cl. 235—92)

ABSTRACT OF THE DISCLOSURE

A magnetically-controlled decimal display wheel of a type positioned by less than ten electromagnets is disclosed in combination with a four-bit register for indicating the decimal equivalent of binary-coded signals stored in the register.

---

The invention relates generally to a magnetically controlled indicia wheel display system, and more particularly concerns positioning of a decimal numeral wheel by aligning the field of a permanent magnet carried by the wheel with the fields of selectively energized external electromagnets.

In known numeral wheel display systems in which the wheel is positioned by magnetic means, an electromagnet is required for each numeral on the wheel. Generally in such systems a permanent magnet is suitably attached to the numeral wheel so that the wheel and the magnet may be positioned by energizing a stationary electromagnet corresponding to the indicium to be displayed. The field of the permanent magnet is aligned thereby with the field of the energized electromagnet. Since it is normally desirable, however, to place the numerals on the periphery of the numeral wheel and to evenly space the numerals around the periphery, such an arrangement requires that the electromagnets also be evenly spaced around the numeral wheel. In order to prevent obscuring the numerals on the periphery of the numeral wheel and yet provide a compact arrangement, one known numeral wheel display device, described in U.S. Patent No. 2,943,-313, has ten stationary electromagnets evenly spaced around the permanent magnet but placed internally of the wheel. To achieve such an arrangement, the coils of the ten electromagnets are wound on a common circular core which fits inside of the wheel. The coils are wound separately and then mounted on the core which is bent open. After mounting the coils on the core, the ends of the core are returned to a circular mating position. This arrangement requires one lead for each coil to supply power to the electromagnets, each of which leads extends from the internal portion of the wheel to external control circuits. Since each circular electromagnet core requires an external frame support, these devices are manufactured as individual single order units.

The present invention reduces the number of electromagnets thus permitting the electromagnets to be located exteriorly of the numeral wheel and on one side thereof so that the opposite side is unobscured for viewing the indicia thereon, thus eliminating the cost of the excessive electromagnets and also the requirement that the electromagnets be located within the numeral wheel.

A primary object of the invention is to provide an improved magnetically controlled indicia wheel display system.

Another object is to arrange a magnetically controlled indicia wheel display system adaptable for arrangement in banks.

Another object is to control an indicia wheel display device by means of electromagnets placed exterior to the wheel, but which permit reading the indicia on the wheel.

Another object is to control an indicia wheel display device by a number of electromagnets which is less than the number of indicium on the periphery of the wheel.

Another object is to control a numeral wheel display device by means of electromagnets responsive to a binary coded decimal representation in an external register and thereby selectively display the decimal numerals 0–9.

Another object is to provide a numeral wheel display device under control of selectively energized electromagnets which may be energized in either of two directions to obtain a plurality of numeral wheel display positions for each electromagnet.

Another object is to place electromagnets around the periphery of a numeral wheel display device in a coded arrangement such that energization of the field of an electromagnet in a direction opposite from a first direction causes the wheel to display a decimal digit one greater than the digit displayed when the electromagnet is energized in the first direction.

Other objects and advantages will appear from the following description in which:

The figure is a right side view of a decimal numeral wheel with a permanent magnet attached thereto, a group of electromagnets positioned around the exterior of the wheel, and a control system including a binary register for selectively energizing the electromagnets.

An arrangement according to the invention is shown in the figure and comprises a numeral wheel 1 mounted for rotation on a shaft 3. The numeral wheel is in the form of a shell and may be molded from a suitable plastic. A permanent magnet 5 is fixed to the numeral wheel. Electromagnets 11, 12, 14 and 18 are arranged around the periphery of the numeral wheel for moving the permanent magnet 5 and the wheel 1 to decimal positions by alignment of respective fields when an electromagnet is energized according to a coded representation in a binary register 15, in a manner presently described. The numeral wheel bears decimal numerals evenly spaced around the periphery of the wheel. For convenience of illustration, the relative positions of the numerals are indicated in the figure by the small numerals 0–9 drawn adjacent the periphery of the wheel. These numerals are actually borne by the numeral wheel on the outer cylindrical surface and should be thought of as traveling with the numeral wheel. Viewing of a selected numeral may be through a window 16 of a suitable cover enclosing the numeral wheel and an associated control system presently described. Additional numeral wheels may be mounted conveniently on the shaft 3 for display of multiple order numbers, each such wheel having electromagnets positioned around the periphery and a binary register and associated circuitry similar to that shown in the figure for selectively energizing the electromagnets.

The register 15 is a register suitable for representing a decimal numeral from 0–9 in a 1, 2, 4, 8 binary code and may be one of many currently available types. For simplicity and clarity the register is represented in the figure as comprising four switches 17, 19, 20 and 21, the coded weight of each switch being indicated by the decimal numeral below the switch.

Normally, the numeral wheel 1 stands in a position in which a zero is displayed. The wheel is moved to this position by means of a positive potential applied through a normally closed contact 23 and the right contact of a pair of contacts 25 to the coil of the electromagnet 11 and then to ground through the left contact of the contact pair 25. The electromagnet 11 is energized thereby in such a direction as to attract a pole 27 of the permanent magnet 5 to the position shown in the figure. With the numeral wheel so positioned, the zero numeral on the periphery of the wheel is positioned opposite the window 16 for display.

Optionally a detent gear 29 may be made integral with the numeral wheel for maintaining the wheel in any numeral position to which it is moved. A detent comb 31 for use with either an individual wheel or a bank of wheels may comprise ordinal teeth 33 for cooperation with respective ordinal detent gears 29 and must be moved clear of the detent gear in order to position the numeral wheels. Then the comb 31 may be moved back into engagement with the detent gear to maintain respective numeral wheels in the positions to which they are rotated by the electromagnets. The wheels therefore may be held in a read-out position even after the electromagnets are de-energized and in a position other than the zero position when the electromagnet is energized normally. Such a detent is essential when the numeral wheels are used for printing in order to hold the wheels stationary.

The electromagnets 12, 14 and 18 are energized respectively by closure of switches 19, 20 and 21 to apply the positive potential through respective contact pairs 35, 36 and 37 to the coil of respective electromagnets. The zero electromagnet 11, however, must be de-energized in order to permit free rotation of the wheel to the correct numeral position. A solenoid 39 having three individual coils, each in series with respective switches 19, 20 and 21 is provided to open contact 23 and de-energize electromagnet 11 whenever one or more of the switches are closed. For example, closure of switch 19 energizes electromagnet 12 through contacts 35. The solenoid 39 is energized thereby to open the contact 23 and de-energize the electromagnet 11. Upon disengagement of the comb 31 with the detent gear 29 the pole 27 is free to move to a position 27–2 opposite the electromagnet 12. The numeral wheel is rotated therewith so that the numeral two is opposite the window 16 for display. Likewise, closure of the switch 20 or the switch 21 energizes electromagnets 14 or 18 to attract the pole 27 to a position 27–4 or 27–8 respectively, thereby rotating the numeral wheel to a position to display either a numeral four or eight.

Closure of switch 17 along with closure of one of the switches 19, 20 or 21, causes the numeral wheel to be positioned to display a numeral that is one greater than two, four or eight, i.e. three, five, or nine respectively; or closure of only the switch 17 causes display of a one instead of a zero. Closure of the switch 17 connects the positive potential across the coil of a solenoid 41. The solenoid 41 is energized thereby, causing the contacts 25, 35, 36 and 37 to transfer so that the positive potential and ground may be applied to opposite ends of the coil of respective electromagnets 11, 12, 14 and 18. With the contacts so transferred, closure of switch 19, 20 or 21 causes energization of respective electromagnets in the opposite direction so that the permanent magnet pole opposite the pole 27 is attracted to the electromagnets. For example, closure of the switch 17 alone causes energization of the electromagnet 11 to produce a magnetic field opposite the one normally produced. This opposite field permits the permanent magnet 5 to align its field therewith so that the pole 27 is in the position 27–1, and the numeral one is opposite the window 16 for display. Likewise, closure of either of the switches 19, 20 or 21 while the solenoid 41 is energized causes the permanent magnet 5 to align its field so that the pole 27 is in a position 27–3, 27–5, or 27–9 respectively.

In order to display a numeral six, both switches 19 and 20 must be closed to energize respective electromagnets 12 and 14. Pole 27 is moved thereby to a position 27–6 so that the numeral six is opposite the window 16. In this position the field of the permanent magnet is aligned with the vector sum of the fields of the electromagnets 12 and 14. In order to display a numeral seven the switch 17 must be closed as well as the switches 19 and 20. Such closure produces a vector field by means of the electromagnets 12 and 14 opposite to that produced by closure of switches 19 and 20 alone. This causes the permanent magnet to rotate so that the pole 27 is in a position 27–7. The numeral wheel is carried thereby to a position in which the numeral seven is opposite the window 16.

The invention claimed is:
1. An indicia wheel display system, comprising:
 (a) a wheel with indicia formed thereon;
 (b) a shaft on which said wheel is mounted for rotation to respective positions of display of said indicia;
 (c) magnetic means attached to said wheel for rotation therewith;
 (d) an electromagnet positioned for cooperation with said magnetic means, said electromagnet having a pair of terminals;
 (e) a single source of potential with respect to a reference level;
 (f) first means operable to apply said potential to one of said terminals and said reference level to the other terminal of said electromagnet for energization in a first direction to attract said magnetic means to a first position and move said wheel to a position of display of a first indicium corresponding to said energization; and
 (g) second means selectively operable to reverse simultaneously the application of said potential and said level to the respective terminals to enable energization of said electromagnet in a second direction to attract said magnetic means to a second position and thereby move said wheel to display a second indicium, said second indicium corresponding to said energization in a second direction.

2. An indicia wheel display system, as defined in claim 1, wherein
 a plurality of additional electromagnets, each having a corresponding pair of terminals, are positioned for cooperation with said magnetic means, said first means are operable to energize selected ones of said electromagnets in the first direction, and said second means are selectively operable to reverse simultaneously the application of said potential and said level to the respective terminals of said selected ones of the electromagnets to enable energization in the second direction.

3. An indicia wheel display system according to claim 2 wherein said indicia wheel bears numerals and said second indicium is one greater than said first indicium.

4. An indicia wheel display system, comprising:
 (a) a wheel bearing indicia representations thereon;
 (b) a shaft on which said wheel is mounted for selective rotation to positions of display of said indicia;
 (c) magnetic means attached to said wheel for rotation therewith;
 (d) a plural-element binary register settable to represent said indicia in a binary code;
 (e) a plurality of electromagnets positioned for cooperation with said magnetic means and equal in number to the number of said elements;
 (f) reversible energization means, including a single source of voltage, for operating each of said electromagnets individually to move said magnetic means and said wheel to alternate display positions; and further including first means operable to energize a first one of said electromagnets to attract said magnetic means and said wheel to a normal position to display an indicium corresponding thereto;
 (g) second means selectively operable according to the setting of said register to energize at least one other of said electromagnets; and
 (h) third means connected to said first means and said second means, said third means being responsive to energization of said other electromagnet by said second means to render said first means inoperable to energize said first electromagnet.

5. A numeral wheel display system comprising:
 (a) a wheel bearing numerals from 0–9;
 (b) a shaft in which said wheel is mounted for selective rotation to positions of display of said numerals;

(c) magnetic means attached to said wheel for rotation therewith;

(d) a maximum of four electromagnets positioned for cooperation with said magnetic means;

(e) reversible energization means, including a single source of voltage, for selectively energizing said electromagnets in opposite directions, and further including first reversible means normally energizing a first one of said electromagnets in a first direction to attract said magnetic means and said wheel to a position corresponding to display of the zero numeral;

(f) a binary register having four output leads for representing values from 1–9 by the coded presence of a predetermined voltage on respective ones of said output leads and for representing a zero by the absence of said voltage on all said output leads;

(g) second reversible means normally connecting three of said four output leads to respective ones of the other three electromagnets for energization in a first direction in response to presence of said voltage on corresponding output leads; and (h) third means connected to said remaining output lead and operable thereby in response to the presence of said predetermined voltage to reverse said first and second means and condition each electromagnet for energization in the opposite direction when said voltage is present on the corresponding output lead.

6. A numeral wheel display system according to claim 5, comprising fourth means connected to said first means and to said three of said four output leads and operable in response to the presence of said predetermined voltage on at least one of said three output leads to disable said first means and prevent energization of said first electromagnet by said first means.

References Cited
UNITED STATES PATENTS

| | | | |
|---|---|---|---|
| 3,218,625 | 11/1965 | Knotowicz | 340—347 |
| 2,428,882 | 10/1947 | Van Santen Kolff | 235—92 |
| 3,089,131 | 5/1963 | Morgan | 235—92 |

MAYNARD R. WILBUR, *Primary Examiner.*

G. J. MAIER, *Assistant Examiner.*